March 13, 1956  F. J. KURTH ET AL  2,737,875
AIR OUTLET DEVICE FOR VENTILATING APPARATUS
Filed July 23, 1951  4 Sheets-Sheet 1

INVENTORS
Franz J. Kurth,
Leonard R. Phillips,
William J. Waeldner,
George R. Wallen,
BY Carroll Bailey
ATTORNEY

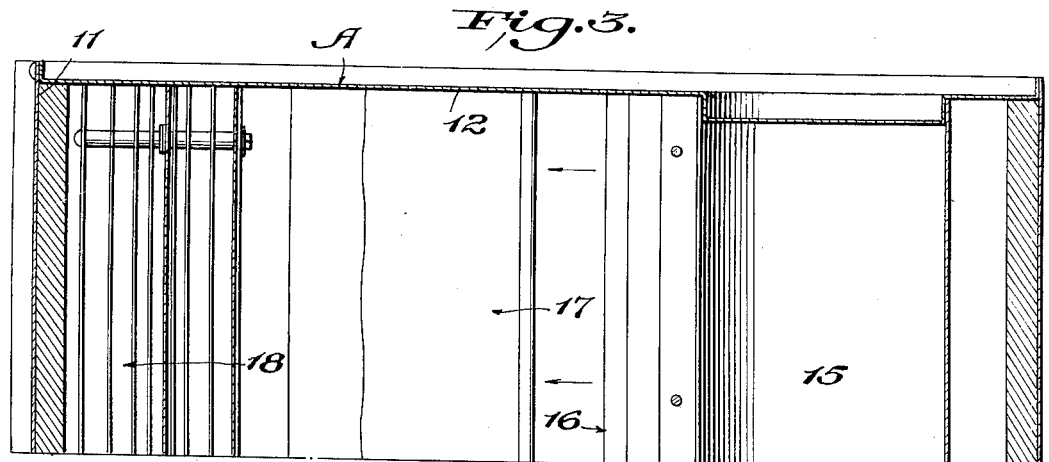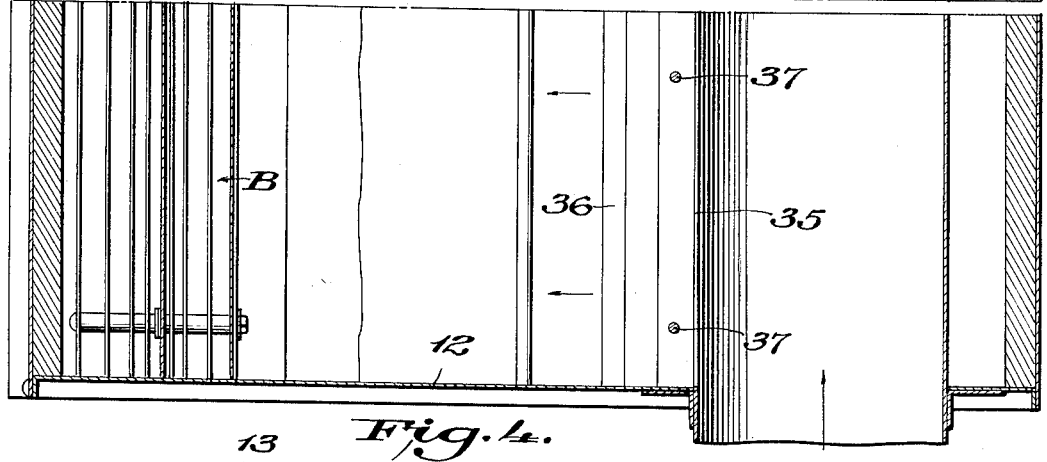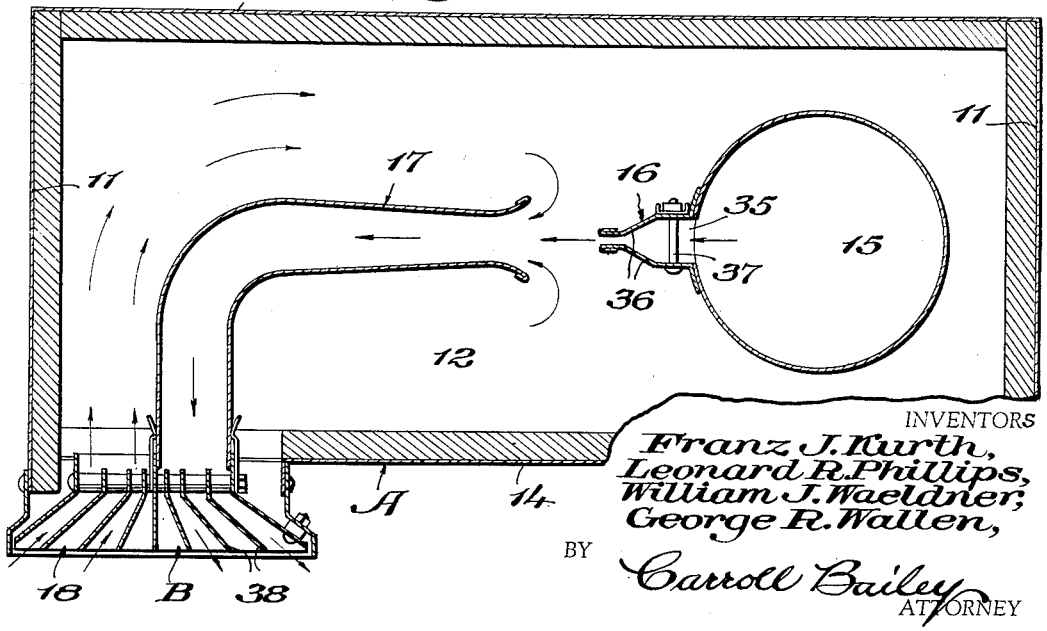

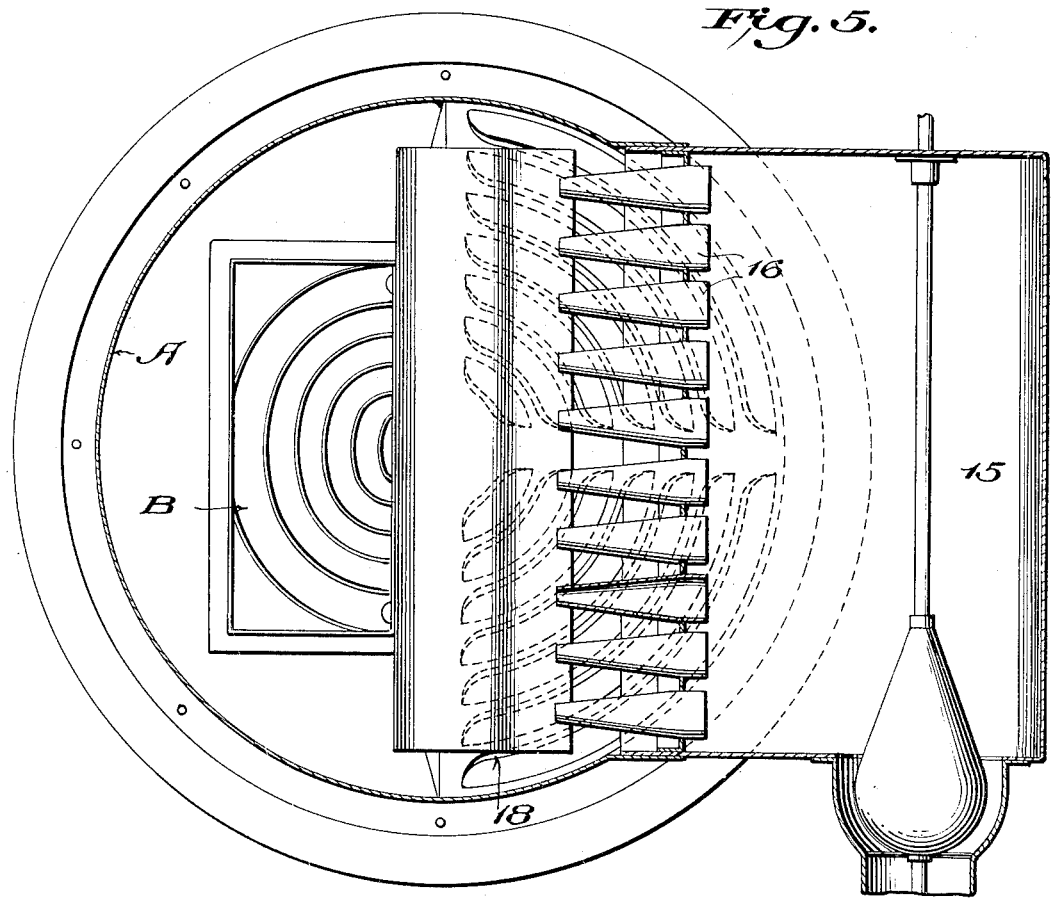
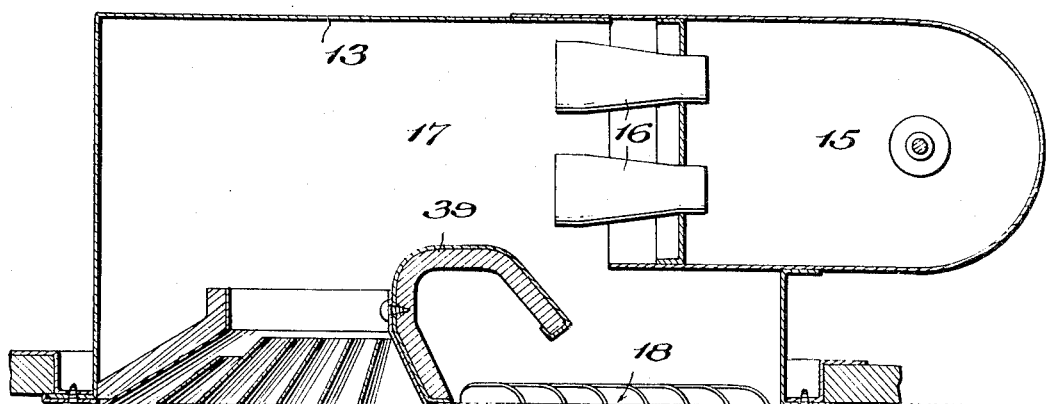

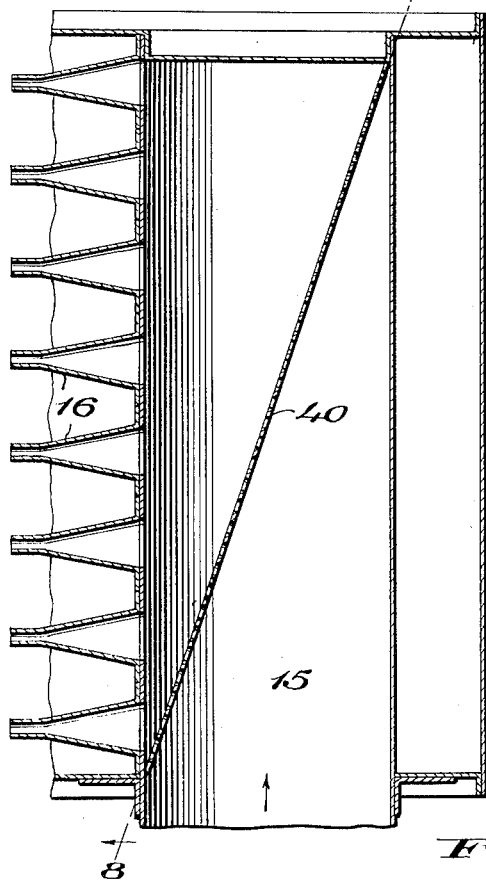
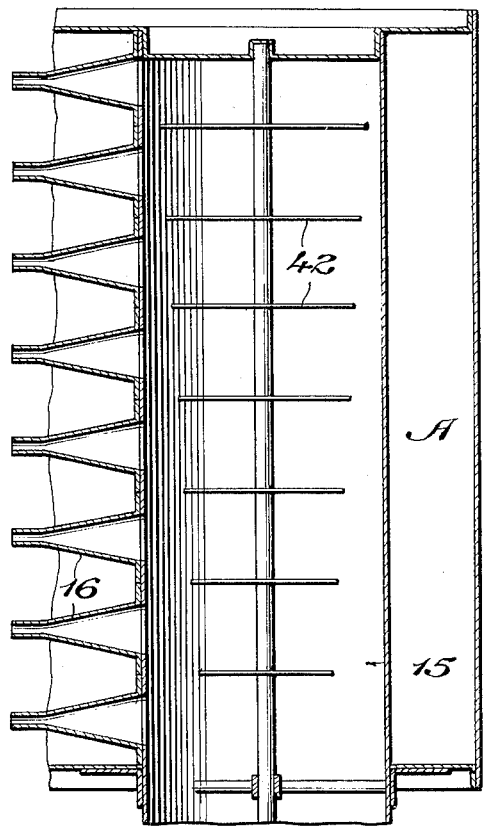
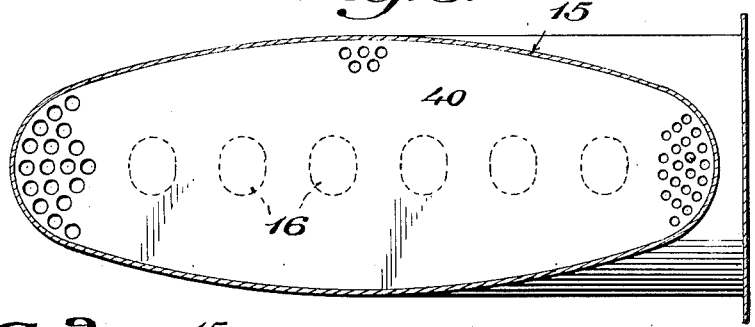
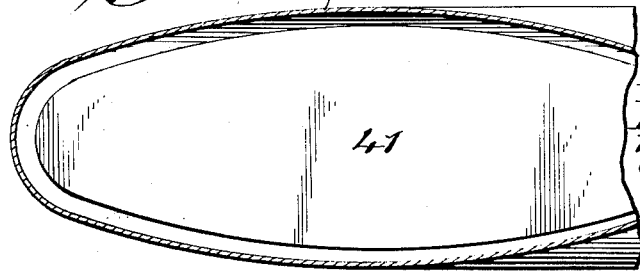

United States Patent Office 2,737,875
Patented Mar. 13, 1956

2,737,875

AIR OUTLET DEVICE FOR VENTILATING APPARATUS

Franz J. Kurth, Mamaroneck, N. Y., Leonard R. Phillips, East Hartford, and William J. Waeldner, Plainville, Conn., and George R. Wallen, Croton-on-Hudson, N. Y., assignors to Anemostat Corporation of America, New York, N. Y., a corporation of Delaware Application July 23, 1951, Serial No. 238,078

3 Claims. (Cl. 98—38)

This invention relates to ventilating apparatus, and has particular reference to improvements in air outlet devices through which air is delivered into rooms or other enclosures for ventilating, heating, cooling or any other purpose.

More particularly, the present invention relates to improvements in air outlet devices of the type which operate not only to deliver so-called "supply" air from any suitable source into a room or other enclosure, but to utilize the supply air to induce room or enclosure air into the devices and to mix the induced air with the supply air, whereby the temperature and the humidity of the supply air are brought more nearly to the temperature and the humidity of the room or enclosure air prior to delivery of the supply air into the room or other enclosure.

In many instances it may be desirable to mix with any given amount of supply air, prior to its delivery into a room or other enclosure, a much greater amount of the room or enclosure air than is possible by means of known air induction types of air outlet devices. Accordingly, one special and important object of the present invention is to provide an air outlet device embodying a simple, practical construction whereby it is effective, due to flow of supply air through the same, to induce into the device and to mix with the supply air an exceptionally large amount of room or enclosure air.

Usually supply air is conducted to rooms or other enclosures through ducts. In this connection in order to conserve duct-occupied space in buildings, as well as to conserve duct material and to minimize duct installation costs, it may be desirable in many instances to employ exceptionally small ducts. In fact, there are many instances where exceptionally small ducts must necessarily be employed. When, however, exceptionally small ducts are employed, it usually is necessary, in order to conduct the required volume of supply air through them, to force the supply air through them at such high velocities as would result in its delivery into a room or other enclosure in undesirable blast form even though its delivery might be through diffusing devices of most efficient known types. Accordingly, another special and highly important object of the present invention is to provide an air outlet device which not only is operable to mix an exceptionally large volume of room or enclosure air with any given amount of supply air delivered through the device, but which additionally is operable to deliver the mixed supply and room or enclosure air into a room or other enclosure substantially without blast effect even though the velocity of the supply air may be exceptionally high, thereby to render practicable the use of exceptionally small ducts and exceptionally high velocities for the delivery of supply air to rooms or other enclosures.

With the foregoing and other objects in view, as will become more fully apparent as the nature of the invention is better understood, the same consists in air outlet devices embodying the novel features of construction, combination and arrangement of parts as are illustrated by way of example in the accompanying drawings and as will be hereinafter more fully described and claimed.

In the accompanying drawings, wherein like characters of reference denote corresponding parts in the different views:

Fig. 3 is a view similar to Fig. 1 illustrating an alternative embodiment of the invention.

Fig. 4 is a vertical section through the air outlet device illustrated in Fig. 3.

Fig. 5 is a view similar to Fig. 1 illustrating another alternative embodiment of the invention.

Fig. 6 is a vertical section through the air outlet device illustrated in Fig. 5.

Fig. 7 is a fragmentary sectional view illustrating a means of equalizing flow of air through nozzles spaced apart along the length of an air supply chamber constituting part of a device constructed in accordance with the invention.

Fig. 8 is a section on the line 8—8 of Fig. 7.

Figure 1:
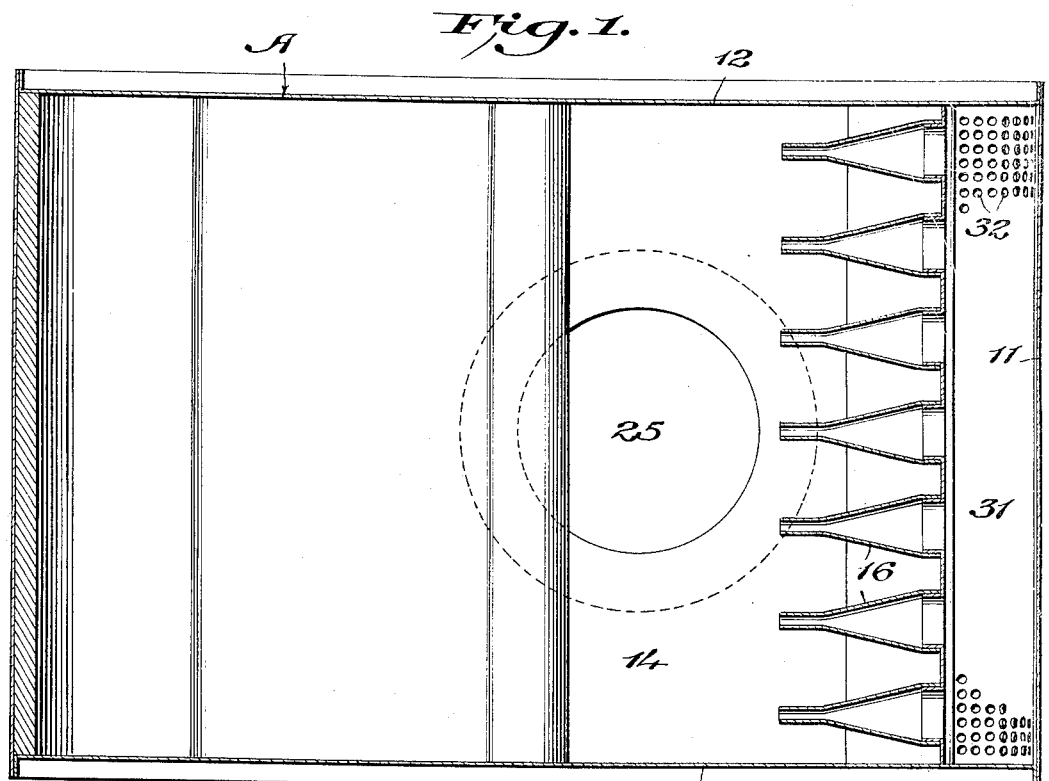
Fig. 1 is a horizontal section through an air outlet constructed in accordance with one practical embodiment of the invention.

Fig. 9 is a view similar to Fig. 8 illustrating an alternative form of means for equalizing flow of air through nozzles spaced along the length of an air supply chamber constituting part of a device constructed in accordance with the invention; and Fig. 10 is a view similar to Fig. 7 illustrating another alternative form of means for equalizing flow of air through nozzles spaced along the length of an air supply chamber constituting part of a device constructed in accordance with the invention.

Referring to the drawings in detail, it will be observed that the present air outlet device, according to each of the illustrated embodiments thereof, includes a suitable casing designated generally as A. This casing may be formed in any suitable manner from any suitable material and may be of any suitable length, width and depth. Moreover, it may be disposed either horizontally, vertically or at any suitable inclination between the horizontal and the vertical, depending upon the manner in which it may be mounted in any particular instance. Accordingly, it may appropriately be described as comprising side walls 11, end walls 12, a rear wall 13 and a front wall 14.

Also in accordance with each of the illustrated embodiments of the invention, there is suitably provided, adjacent to one side of the casing A, either inside or outside said casing, and extending longitudinally thereof, a supply air chamber 15 which may be coextensive in length with said casing or of any suitable lesser length than said casing.

Further in accordance with each of the illustrated embodiments of the invention, the chamber 15 is provided with nozzle means 16 for the jet discharge of supply air from the same into the casing A; a conduit 17 of venturi form is provided in said casing A with its inlet end in alinement with but spaced from the nozzle means 16 and with its outlet end arranged to discharge through an air diffuser B to the exterior of the casing A at the front of the latter; and suitable means 18 is provided for the inlet of room or enclosure air into said casing A.

Figure 2:
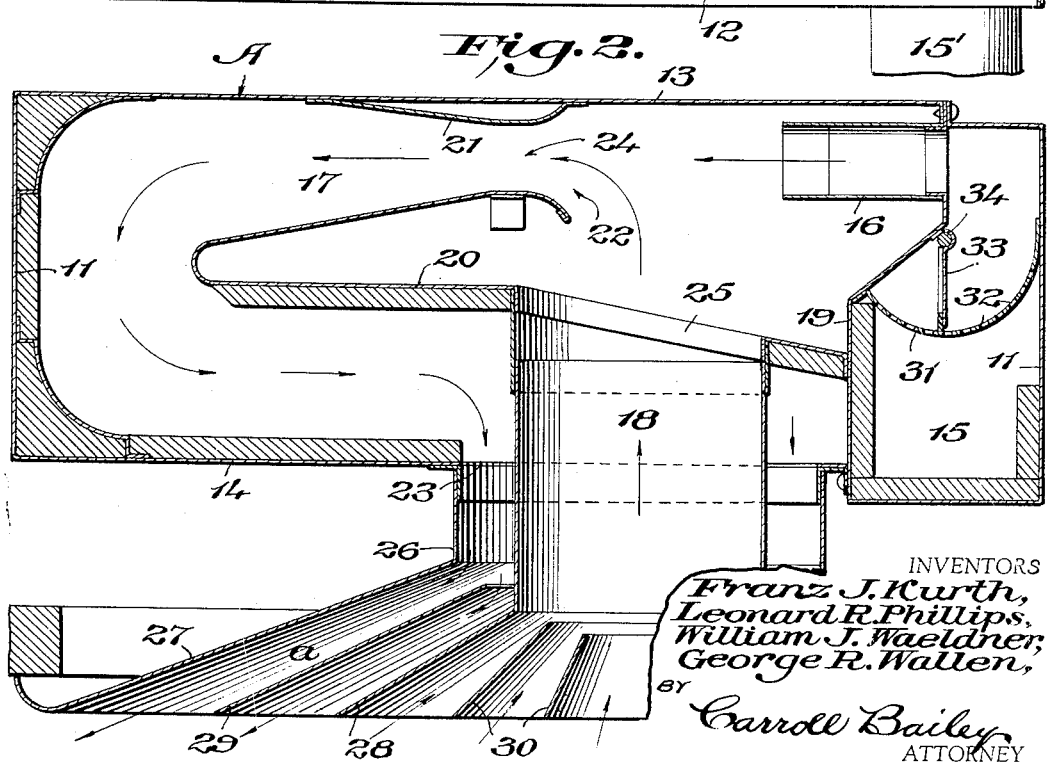
Fig. 2 is a vertical section through the air outlet device shown in Fig. 1.

Referring now more particularly to the Figs. 1 and 2 embodiment of the invention, it will be observed that a partition wall 19 extends between the rear and the front walls 13 and 14 of the casing A adjacent to one of the side walls 11 of said casing and thereby cooperates with said side wall and portions of said rear and front walls to provide the chamber 15. It will also be observed that the nozzle means 16 comprises a plurality of nozzles which extend from the partition wall 19 toward the other side wall of the casing A and are arranged in a row longitudinally of said casing for delivery of air in jet form into the passageway 17 from the chamber 15.

Extending between the partition wall 19 and a point suitably spaced from the second mentioned side wall of the casing A is a second partition wall 20 which is suitably shaped for cooperation with the rear and the front walls and with the second mentioned side wall of said casing, and with a plate 21 carried by the said rear wall of said casing, to provide in said casing the aforesaid venturi passageway 17. As in the case of the chamber 15, this passageway 17 may be coextensive in length with the casing A or of any desired lesser length than said casing. In any event, said passageway is, generally speaking, of C-shape in cross section, has an open mouth 22 alined with and spaced from the nozzles 16, and leads through an opening 23 in the front wall 14 of the casing A to the air distributor B for discharge of air through the latter into a room or other enclosure. Moreover, said passageway 17 is constricted near its mouth, as indicated at 24, and flares from its said constriction toward its outlet end, whereby it has the effect of accelerating flow therethrough of air delivered to the same from the nozzles 16.

In the partition wall 20 is an opening 25 which, in any suitable manner, is denied communication with the passageway 17, except by way of the mouth 22 thereof, and is in communication with the room or other enclosure into which said passageway discharges. In this connection and as illustrated by way of example in the drawings, the air distributor B includes an outer neck 26 which is connected to the opening 23 and a smaller, inner neck which is connected to the opening 25 and constitutes the aforesaid means 18 for the inlet of enclosure air to the casing A, the said two necks being concentric and the space between them constituting an extension of the passageway 17 for delivery of air from the latter. As will be apparent, the inner neck denies communication between the opening 25 and the passageway 17, except by way of the mouth of the latter, and, at the same time, provides for flow through the opening 25 to the interior of the casing A and, hence to the mouth of said passageway 17, of air from a room or other enclosure into which said passageway 17 discharges.

According to the specific embodiment of the invention illustrated in Figs. 1 and 2, the air distributor B is of circular shape and includes flaring members 27 and 28 constituting forward and outward extensions of the necks 26 and 18, respectively. Thus, air flowing from the passageway 17 is deflected outwardly by the flaring member 27 through the flaring passageway $a$ between said flaring members whereby it is distributed over a large area of the room or other enclosure into which it is delivered. Moreover, due to the flaring shape of said passageway $a$, the air is permitted to expand therein whereby it is delivered into the room or other enclosure in diffused form. If desired, an open-ended, hollow flaring member 29, or any desired plurality of such members, may be provided in the passageway $a$ to divide the air flowing therethrough into a plurality of separate streams to increase the diffusion effect of the device B. Other members 30 of flaring or any other suitable form may, if desired, be provided within the flaring member 28 to insure that air flowing from the room or other enclosure to and through the neck 18 will be taken from an area of the room or other enclosure of considerably greater diameter than the diameter of said neck 18.

High velocity air may be supplied to the chamber 15 in any suitable manner and flows from said chamber at high velocity through the nozzles 16. From the nozzles 16 the supply air issues in jet form and flows directly into the mouth of the passageway 17. Then, due to its flow through the constriction 24 of said passageway and to its subsequent expansion in said passageway, its velocity is accelerated. As a result there is created in and adjacent to the inlet end portion of the passageway 17 a strong induction action which has the effect of inducing through the neck 18 and drawing into the casing A and the passageway 17 and mixing with the supply air an exceptionally large amount of room or enclosure air in proportion to the amount of the supply air. The mixed supply and room or enclosure air then flows through the passageway 17 to and through the space between the necks 26 and 18 and to and through the space $a$ between the flaring members 27 and 28, all the while expanding and having its velocity reduced and becoming more thoroughly mixed so that it finally is delivered from the passageway $a$ into the room or other enclosure at comparatively low velocity and in diffused form.

Obviously, since the present device is specially designed to utilize exceptionally high velocity supply air to induce into and mix with any given amount of the supply air an exceptionally large proportion of room or enclosure air and to deliver the mixed air into a room or other enclosure at relatively low velocity and in diffused form, and since induction of an exceptionally large amount of room or enclosure air in proportion to the amount of the supply air enables satisfactory ventilating, heating, cooling or other results to be attained by the use of an exceptionally small amount of supply air as well as by exceptionally wide differences in temperature and humidity between the supply air and the room or enclosure air, it is apparent that an exceptionally small duct and exceptionally high velocity may advantageously be employed for the delivery of supply air to said device and that also advantageously there may be exceptionally wide differences in temperature and humidity between the supply air and the room or enclosure air.

For most efficient operation of the present device it is desirable to provide means to insure the flow of substantially the same amount of supply air to each of the nozzles 16. In this connection, and according to the Figs. 1 and 2 embodiment of the invention, an air supply duct 15' is connected to one end of the chamber 15, adjacent to the front of said chamber, the other end of said chamber is closed, the nozzles 16 are located adjacent to the rear of said chamber, and there is provided in said chamber, between the front and the rear portions thereof, an apertured plate 31 having a large number of small openings 32 therein through which the supply air must flow in order to reach the nozzles 16. The result is that the supply air is substantially equally divided along the length of the chamber 15 before it reaches the nozzles 16 so that each nozzle receives substantially the same amount of supply air. If desired, the openings 32 may be suitably varied in size or number or both in size and number along the length of the plate 31 to insure that each nozzle 16 will receive substantially the same amount of supply air. The apertured plate 31 has the further effect of changing the direction of flow of the supply air from longitudinally of the chamber 15 to transversely of said chamber whereby it is directed toward the nozzles 16.

While any suitable valve means may be employed at any suitable location to regulate flow of supply air to the nozzles 16, it may be desirable to incorporate such valve means in the present device. In that case a simple, practical valve means may comprise a plate 33 coextensive or substantially coextensive in length with the chamber 15 and hinged along one side edge thereof to a side wall of said chamber, as indicated at 34, for swinging movement in any suitable manner toward and away from the other side wall of said chamber to vary the effective area through which supply air may flow to the nozzles 16.

Referring now particularly to the embodiment of the invention illustrated in Figs. 3 and 4 of the drawings, it will be observed that the supply air chamber 15 is in the form of a tube disposed in the casing A and having an air outlet slot 35 extending longitudinally thereof, and that the nozzle means 16 is in the form of a pair of flanges 36 extending from said tube at opposite sides of said slot. Suitable adjusting means, such as bolts 37, connect said flanges whereby they may be adjusted to increase or decrease the width of the space between their outer edges to vary their jet effect for most efficient operation under any particular conditions. Moreover, the bolts 37 or their equivalents provide a means of obtaining substantially the same jet effect along the length of the nozzle means 16 since they may be adjusted to vary the width of the space between the flanges 36 at different points along the length of said flanges.

It will further be observed that according to the Figs. 3 and 4 embodiment of the invention the air distributor B is of straight, elongated form and extends from end to end of the casing A, but is basically similar to the circular air distributor of the Figs. 1 and 2 form of the invention in that it is flared and includes a plurality of flaring members 38 to divide air flowing through the same into a plurality of separate streams and to deflect them more or less laterally. It will also be observed that the air inlet means 18 of the Figs. 3 and 4 embodiment of the invention is a duplicate or substantially a duplicate of the elongated air distributor B. In other respects the Figs. 3 and 4 embodiment of the invention is generally the same both structurally and in mode of operation as the Figs. 1 and 2 embodiment of the invention.

Referring now particularly to the embodiment of the invention illustrated in Figs. 5 and 6 of the drawings, it will be observed that the main portion of the casing A is of circular shape and that the chamber 15 is located at one side of said main portion and is of a length approximately equal to the diameter of said main portion. It will further be observed that the nozzle means 16 is in the form of two rows of nozzles extending longitudinally of the chamber 15 and arranged to discharge toward the opposite side of the main portion of the casing A; that a wall 39 approximately coextensive in length with and parallel to the chamber 15 extends first rearwardly a suitable distance from the front wall 14 of the casing A and then toward the chamber 15 to provide in conjunction with the rear wall 13 of said casing the venturi passageway 17; that the air distributor B is of the type illustrated in Kurth Patent No. 2,300,049 of October 27, 1942, and that the air inlet means 18 is in the form of louvers in the front wall 14 of the casing. Otherwise the Figs. 5 and 6 embodiment of the invention is generally the same, both structurally and in the mode of operation, as the previously described embodiments of the invention.

In any instance where supply air is delivered to one end of the chamber 15 and the nozzle means 16 is not itself adjustable to obtain flow of substantially equal amounts of air therethrough at different points along the length thereof, as in the Figs. 3 and 4 embodiment of the invention, but is in the form of a row or rows of separate nozzles, means such as are illustrated in either of Figs. 7 and 8 or 9 or 10 of the drawings may be employed to insure such flow.

For example, as illustrated in Figs. 7 and 8, a perforated plate 40 may extend diagonally within and from end to end of the chamber 15 so as to divide said chamber into inlet and outlet portions and to require the supply air to pass through the perforations of said plate in order to reach the nozzles 16. The supply air flows, of course, longitudinally through the inlet portion of the chamber 15 in a direction at right angles to the axis of the nozzles 16, but in passing through the perforations of the plate 40 is broken up into a multiplicity of small, separate streams and has its direction of flow changed toward the nozzles 16 so that it is delivered in substantially equal amounts to said nozzles even though the perforations may be of equal size. However, the perforations may be varied either in size or number, or both in size and number, along the length of the plate 40 to insure the delivery of equal amounts of supply air to the nozzles 16. For example, since the diagonal disposition of the plate 40 relative to the chamber 15 produces a decrease in the cross sectional area of the inlet portion of the chamber 15 toward the closed end of the latter, and since this decrease in cross sectional area results in a build-up of supply air pressure toward the closed end of said chamber, the perforations of the plate 40 may appropriately be less in number or of reduced size, or both less in number and of reduced size, toward the closed end of the chamber 15 in order to compensate for the build-up of supply air pressure toward said end of said chamber.

As illustrated in Fig. 9 of the drawings, a non-perforated plate 41 may extend diagonally of the chamber 15, as in the case of the plate 40, and may be of such varying width as to afford, between its edges and the adjacent walls of the chamber 15, spaces of greatest width adjacent to the air inlet end of said chamber and of progressively decreasing width toward the closed end of said chamber, thereby to insure flow of substantially equal amounts of supply air to the nozzle means 16 at all points along the length thereof.

As illustrated in Fig. 10 of the drawings, there may be suitably mounted in the chamber 15 at points spaced apart along the length thereof a plurality of supply air intercepting and deflecting disks 42 of progressively increasing diameters toward the closed end of said chamber for the purpose of insuring flow of substantially equal amounts of supply air to the nozzle means 15 at all points along the length thereof.

Obviously, any of the different air distributors B and air inlet means 18 may be used in any of the different embodiments of the invention. For example, an air distributor and air inlet means such as are illustrated in Figs. 3 and 4 or Figs. 5 and 6 may be used in lieu of the specific air distributor and inlet means shown in Figs. 1 and 2. Alternatively, an air distributor and air inlet means such as are shown in Figs. 1 and 2 may be used in lieu of an air distributor and an air inlet means such as are shown in Figs. 3 and 4 or Figs. 5 and 6.

Summarizing, it will be apparent that according to each of the embodiments of the invention, supply air is delivered through nozzle means in jet form to a venturi passageway, has its velocity first accelerated and then decelerated by flow through said passageway, induces into said passageway, due to its acceleration, an amount of room or enclosure air which is exceptionally large in proportion to the amount of the supply air, and delivers the mixed supply and induced room or enclosure air into a room or other enclosure in diffused form. As a result it will further be apparent that the supply air may be supplied at exceptionally high velocity; that the supply air duct may therefore be exceptionally small, and that there may be exceptionally wide differences in temperature and humidity between the supply air and the room or enclosure air without effecting sudden change in the temperature and the humidity of the total volume of the room or enclosure air.

From the foregoing description considered in connection with the accompanying drawings it is believed that the construction and operation of the different illustrated forms of the present device will be clearly understood and that their advantages will be appreciated. It is desired to point out, however, that while only certain specific structural embodiments of the invention have been illustrated and described, the same is readily capable of various other specifically different structural embodiments within its spirit and scope as defined in the appended claims.

We claim:

1. A device for delivery of air into an enclosure, said device comprising a chamber, a combined air inlet and outlet device carried by said chamber and including an air diffusing air outlet portion disposed to discharge air into the enclosure and an air inlet portion within and concentric with said air outlet portion and connected to said chamber for flow therethrough into said chamber of enclosure air to replace air exhausted from said chamber, means providing in said chamber an air passageway including an inlet end portion opening into said chamber and an outlet end portion connected to the air outlet portion of said combined device, nozzle means in said chamber alined with and spaced from inlet end portion of said passageway for delivery of supply air in jet form from a source of supply into said passageway, said passageway having a constricted throat and further having its inlet and outlet end portions converging toward and flaring from said throat, respectively, whereby supply air delivered by said nozzle means into said passageway has its velocity accelerated and induces into said passageway for admixture therewith air from said chamber.

2. A device for delivery of air into an enclosure, said device comprising a chamber, a combined air inlet and outlet device carried by said chamber and including an air diffusing air outlet portion disposed to discharge air into the enclosure and an air inlet portion disposed within said outlet portion and connected to said chamber for flow therethrough into said chamber of enclosure air to replace air exhausted from said chamber, means providing in said chamber an air passageway including an inlet end portion opening into said chamber and an outlet end portion connected to the outlet portion of said combined device, the air inlet portion of said combined device extending through the outlet end portion of said passageway into said chamber to a point in proximity to the inlet end of said passageway, nozzle means in said chamber alined with and spaced from the inlet end portion of said passageway for delivery of supply air in jet form from a source of supply into said passageway, said passageway having a constricted throat and further having its inlet and outlet end portions converging toward and flaring from said throat, respectively, whereby supply air delivered by said nozzle means into said passageway has its velocity accelerated and induces into said passageway for admixture therewith air from said chamber.

3. A device for delivery of air into an enclosure, said device comprising a chamber including front and rear walls, means including a partition in said chamber between said front and rear walls providing in said chamber an air passageway of substantially C-shape including an inlet end portion at one side of said partition opening into said chamber and an outlet end portion at the other side of said partition opening through said front wall, a combined air inlet and outlet device carried by said chamber and including an air diffusing outlet portion connected to the outlet end of said passageway and disposed to discharge air into the enclosure and an air inlet portion disposed within said air outlet portion and extending through said partition at a point adjacent to the inlet end of said passageway, and nozzle means in said chamber alined with and spaced from the inlet end of said passageway for delivery of supply air in jet form from a source of supply into said passageway, said passageway having a constricted throat and further having its inlet and outlet end portions converging toward and flaring from said throat, respectively, whereby supply air delivered by said nozzle means into said passageway has its velocity accelerated and induces into said passageway through the inlet portion of said combined air inlet and outlet device air from the enclosure for admixture with the supply air.

References Cited in the file of this patent

UNITED STATES PATENTS

| | | |
|---|---|---|
| 1,296,968 | Klein | Mar. 11, 1919 |
| 1,878,012 | Stacey, Jr. et al. | Sept. 20, 1932 |
| 1,887,938 | Lewis | Nov. 15, 1932 |
| 1,995,667 | Cano | Mar. 26, 1935 |
| 2,000,597 | Keyes | May 7, 1935 |
| 2,032,692 | Foss | Mar. 3, 1936 |
| 2,094,734 | Byron | Oct. 5, 1937 |
| 2,300,574 | Jepertinger | Nov. 3, 1942 |
| 2,340,252 | Palmer | Jan. 25, 1944 |
| 2,345,536 | Keep | Mar. 28, 1944 |
| 2,345,672 | Howse et al. | Apr. 4, 1944 |
| 2,413,937 | Zademach et al. | Jan. 7, 1947 |
| 2,422,560 | Palmer | June 17, 1947 |
| 2,539,061 | Coles | Jan. 23, 1951 |
| 2,541,280 | Phillips | Feb. 13, 1951 |
| 2,577,550 | Wahlin | Dec. 4, 1951 |
| 2,613,587 | MacCracken | Oct. 14, 1952 |

FOREIGN PATENTS

| | | |
|---|---|---|
| 968,359 | France | Apr. 19, 1950 |